United States Patent [19]

Muller et al.

[11] 4,422,350

[45] Dec. 27, 1983

[54] GEAR SHIFT CONTROL IN MOTOR VEHICLES WITH AUTOMATIC TRANSMISSIONS

[75] Inventors: Alfred Muller, Leonberg; Gerhard Eschrich, Gerlingen; Achim Schreiber, Schwieberdingen, all of Fed. Rep. of Germany

[73] Assignee: Robert Bosch GmbH, Stuttgart, Fed. Rep. of Germany

[21] Appl. No.: 235,523

[22] Filed: Feb. 18, 1981

[30] Foreign Application Priority Data

Mar. 21, 1980 [DE] Fed. Rep. of Germany ....... 3010865

[51] Int. Cl.³ .............................................. F16H 3/44
[52] U.S. Cl. ...................................... 74/753; 74/866; 364/424.1
[58] Field of Search ............... 74/DIG. 1, 752 A, 753, 74/863–869; 192/12 C, 13 R, 18 A, 87.14, 87.18, 87.19; 364/424.1

[56] References Cited

U.S. PATENT DOCUMENTS 3,741,042  6/1973  Ravenel .................... 74/752 A X
4,228,700 10/1980  Espenschied et al. ............. 74/866
4,262,335  4/1981  Ahlen et al. ..................... 74/866 X
4,290,322  9/1981  Huitema ........................ 74/752 A Primary Examiner—Leslie A. Braun
Assistant Examiner—Frank H. McKenzie, Jr.
Attorney, Agent, or Firm—Frishauf, Holtz, Goodman, Woodward

[57] ABSTRACT

The time required for shifting gears from an old to a new gear and the jolt created by the shift is decreased by initiating a known overlap of disengagement of the friction elements of the old gear and engagement of the friction elements of the new gear at the time the hydraulic unit operating the friction elements of the new gear is completely filled. Since a voltage pulse occurs across the solenoid winding of the pressure regulator when the hydraulic unit is completely filled, the solenoid valve is monitored by a threshold circuit which responds to the pulse. The output of the threshold circuit sets a flipflop. The flipflop is reset in response to a gear shift initiation signal furnished by a microprocessor. The microprocessor samples the flipflop output to determine whether the hydraulic unit is completely filled and initiates the overlap portion of the gear shift when this is so.

5 Claims, 2 Drawing Figures

GEAR SHIFT CONTROL IN MOTOR VEHICLES WITH AUTOMATIC TRANSMISSIONS

CROSS-REFERENCE TO RELATED APPLICATIONS AND PUBLICATIONS (1) DE-OS 27 42 031, to which U.S. Pat. No. 4,228,700, ESPENSCHIED et al., assigned to the assignee of this application, corresponds.

The present invention relates to automatic transmissions in motor vehicles and, more particularly, to automatic transmissions wherein the engagement of the friction elements of the new gear overlaps with the disengagement of the friction elements of the old gear.

BACKGROUND OF THE INVENTION

Automatic transmissions are utilized in a number of applications, for example, in motor vehicles, to transmit the torque from the driving motor to an output. For example, the torque may be transmitted from an internal combustion engine to the wheels. The operation of the transmission permits the engine to operate in the most advantageous torque ranges. Depending upon the type of transmission, the torque transmission from the engine to the output may or may not be interrupted during the shift from one gear ratio to another. Today, in automatic transmissions wherein gear shift takes place "under load", that is without force or torque transmission interruption, the transmissions utilize planetary gears. To change the gear ratio, one of the gears, for example the sun gear or the planet gears is either driven or braked hydraulically by the activation of clutches or brakes. Valves are provided which control the amount of fluid in hydraulic units operating the gear elements associated with the individual gear ratios. During gear shift from an engaged or prior to a newly selected gear, the valve associated with the engaged, or prior, or old gear must be shut off while the valve associated with the newly selected or new gear i.e. the gear to be engaged must be activated. In order to prevent an interruption in torque transmission, the valve associated with the gear to be engaged must be activated before the valve associated with the engaged, or old gear is shut off. This process is known as positive overlap control. A transmission control arrangement of this type is described in German published application DE-OS 27 42 031 to which U.S. Pat. No. 4,228,700, ESPENSCHIED et al., corresponds.

The actual overlap operation of the friction elements of the transmission must be delayed relative to the time that a signal indicating a desired gear shift is received in order to be sure that the hydraulic units which operate the friction elements are completely filled. This increases the time required for a gear shift.

Further, when the hydraulic units are completely filled and the friction elements engage without transmitting any substantial torque, the latter are under an additional load and a sudden decrease occurs in the output torque.

THE INVENTION

It is an object of the present invention to furnish an automatic transmission wherein the time required for a gear shift is decreased and transient decreases in the output torque during gear shift are minimized. This in turn decreases the shifting shock or jolt to which the vehicle and its passengers are subjected.

In accordance with the present invention, the hydraulic unit operating the friction elements associated with the gear to be engaged, or the new gear is monitored and a signal is generated when it is completely full. This signal is applied to a control unit, such as a microprocessor, and the microprocessor initiates the overlap portion of the gear disengagement and engagement in response thereto.

Preferably, the monitoring of the hydraulic unit is accomplished by a threshold circuit connected across the solenoid winding of a pressure regulator regulating the pressure in the hydraulic unit. When the hydraulic unit is full, a pulse appears across this winding. The amplitude of the pulse exceeds the threshold of the threshold unit. The resulting threshold output signal is applied to a control unit, such as a microprocessor, which then initiates the overlapping engagement-disengagement of the friction elements associated with the engaged and to be engaged gears, respectively.

DESCRIPTION OF THE PREFERRED EMBODIMENT

The operation of the friction elements of the engaged and newly selected gears must overlap in time if interruption of torque transmission is to be prevented. The operating force of the friction elements, for example the clutches in the engaged and the newly selected gear, corresponds to the hydraulic pressure in the units operating the friction elements, that is, approximately to the clutch pressure. The clutch pressures in the engaged and the newly selected gears are denoted by $P_{Ka}$ and $P_{Kn}$, respectively. The gear shift initiating signal is generated at time $t_o$. This causes the clutch of the new gear to be filled. Hydraulic fluid flows into a cylindrical chamber and operates a piston against the force of a spring. When the piston reaches its end stop, the filling process ends suddenly and a pressure peak develops which is indicated at time $t_1$ in FIG. 1 for the curve illustrating the variation of $P_{Kn}$. The time required for filling the coupling depends on various conditions and cannot be predetermined exactly. Thus, in presently known equipment, a time interval $\Delta t$ is provided which delays the start of the clutch action (time $t_2$) relative to time $t_o$ sufficiently to assure that the clutch is filled at the start of operation. For this purpose, the time interval $\Delta t$ must, of course, be sufficiently large so that the maximum time required to fill the clutch under the various operating conditions is accommodated.

The operating pressure $P_{Ka}$ of the old gear is decreased at time $t_o$ from an operating value, with safety margin to a value just sufficient to transmit the then-present torque. At time $t_2$, the clutch of the newly selected gear is engaged and the clutch of the old gear is disengaged. The gear shift is completed at time $t_4$. This results from the time variation of pressures $P_{Kn}$ and $P_{Ka}$ in that the pressure $P_{Kn}$ at time $t_2$ has a value at which it is already in contact but is not as yet transmitting any substantial torque. From this value, it is increased until time $t_3$. At time $t_3$, the operating pressure required to transmit the then-present torque is being applied and the new clutch thus transmits all of the torque. Meanwhile, the pressure of $P_{Ka}$ of the old clutch is decreased from the operating pressure to zero in the time starting at $t_2$ and ending at time $t_3$. At time $t_4$, the pressure in the new coupling is adjusted to a value with safety margin for example 150% of that required to transmit the then present torque. Preferably, this is accomplished by adjusting the operating current of the pressure regulator to a constant high value.

Figure 1:
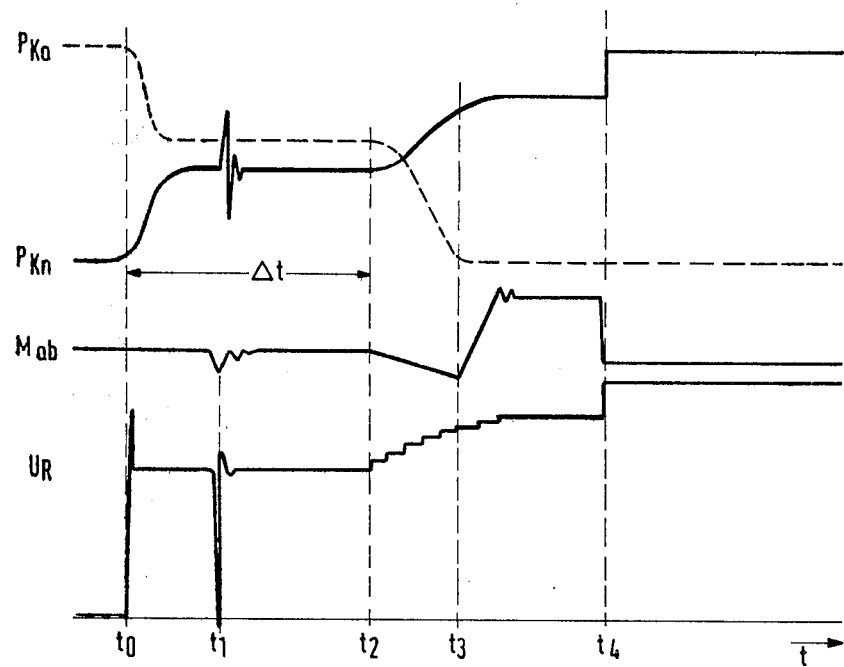
FIG. 1 is a diagram illustrating the variation with respect to time of the operating pressure in the friction elements of the engaged and newly selected gear, the output torque and the voltage at the pressure regulator during gear shift of a prior art transmission.

The variation of the pressure in the clutches of the old and new gears results in a variation in output torque $M_{ab}$ as illustrated in FIG. 1. It should be noted that both the pressure peak at time $t_1$ and the pressure rise or decrease at time $t_2$ result in transient output torque changes. A rapid variation with respect to time of output torque results in a jolt to the vehicle. The curves of FIG. 1 present the conditions for upshift under load. This means that the output torque after the shift is less than that before. The transient increase of torque between times $t_3$ and $t_4$ results from the fact that the motor must be disconnected in order to reach the lower synchronous speed.

The present invention provides for monitoring of the amount of fluid in the coupling of the newly selected gear; that is, the time $t_1$ is very exactly determined and the overlap control ($t_2$ to $t_3$) starts immediately at time $t_1$. This association of the times of complete filling of the coupling and the start of the overlap control has the advantage that only the time required for actually filling the clutch is used and, further, that the discontinuities in output torque illustrated as appearing at time $t_1$ and $t_2$ occur simultaneously. Thus, only one break in torque occurs and only one jolt.

Figure 2:
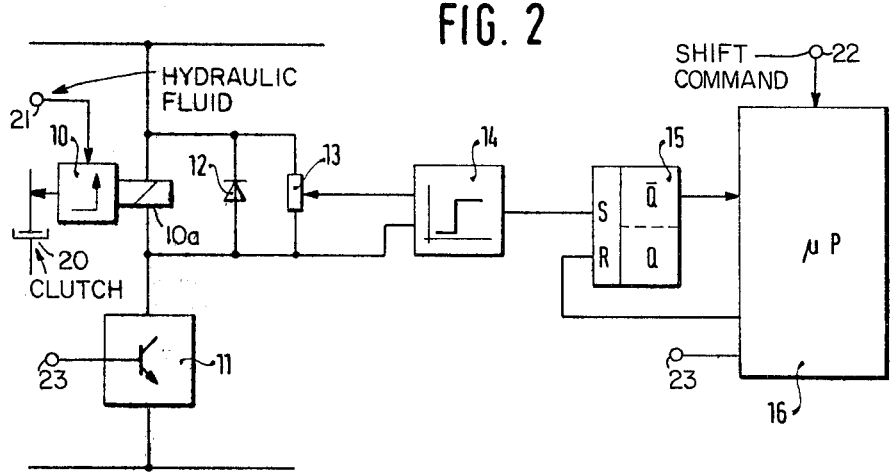
FIG. 2 is a block diagram of an embodiment of the present invention.

Monitoring of the degree of filling of the clutch is achieved by monitoring the voltage across the windings of the electro-hydraulic, current controlled pressure regulator illustrated in FIG. 2. An output stage 11 controls electro-hydraulic pressure regulator 10 under command from a gear control unit, connected via terminals 23. The current through pressure regulator 10, that is the current furnished by output stage 11, determines the operating pressure of hydraulic fluid supplied at 21 of a controlled friction element, that is for example, a clutch 20. When the clutch 20 is filled, the pressure peak at time $t_1$ reacts back to pressure regulator 10 causing a peaking of the voltage $U_R$ across the winding of pressure regulator 10. This is illustrated in the lowest curve in FIG. 1. In order to detect voltage $U_R$, a protective diode 12 and resistor R13 are connected in parallel with the winding of the solenoid valve of the pressure regulator 10. At least part of the voltage across resistor 13 is applied to a threshold stage 14. When the voltage peak illustrated in FIG. 1 appears at time $t_1$, the threshold of threshold stage 14 is passed and a pulse is generated. The actual value of the threshold may be adjusted by adjustment resistor 13. The generated pulse can be used directly to initiate the overlap control of the clutches of the engaged and the newly selected gears.

In a preferred embodiment of the invention, the output signal from threshold stage 14 is applied to a flipflop 15 whose output is connected to a gear control unit 16. Gear control unit 16 is, for example, a microprocessor. When a signal indicating desired gear shift appears in control unit 16 at time $t_0$, a pulse is applied to the reset input of flipflop 15 and flipflop 15 is therefore set for monitoring the filling operation. The output signal from threshold stage 14, which indicates the end of the filling process, causes flipflop 15 to be set and a signal to be applied to gear control unit 16, e.g. the microprocessor. The signal remains at the output of flipflop 15 until the signal indicating the next desired gear shift under operator, or driver control is applied to control unit 16 via terminal 22, and causes flipflop 15 to be reset. The use of flipflop 15, or rather the buffer storing of the signal indicative of complete filling of the clutch, has the advantage that the information is steadily available at the output of flipflop 15 and can therefore be interrogated by the microprocessor at any desired time. It is therefore not necessary that the microprocessor continually samples the output of threshold stage 14 to see whether a signal indicative of complete filling of the hydraulic unit operating the clutch is present.

Various changes and modifications may be made within the scope of the inventive concepts.

We claim:

1. Automatic transmission control system for use in an automotive vehicle having
   friction elements (20);
   electrical current controlled hydraulic pressure regulator means (10) having a solenoid winding through which electrical current passes in operation, operating the friction elements;
   control means (22, 16, 23) for controlling the pressure regulator means for disengagement, and engagement, of the friction elements of an engaged gear and a newly selected, to be engaged gear, respectively, to overlapping engagement with said friction elements, during shifting between the gears;
   a threshold circuit (14) sensing an electrical signal pulse appearing across the solenoid winding upon changing of state of the friction element associated with the newly selected, to be engaged gear representative of when a hydraulic unit of the newly selected, to be engaged gear is filled;
   and connection means (15) connecting said signal pulse to said control means (22, 16, 23), said control means controlling overlap over disengagement, and engagement of the friction elements of the engaged, and newly selected, to be engaged gear in response to said signal pulse.

2. System according to claim 1, wherein said connecting means (15) includes a buffer storage element.

3. System according to claim 2, wherein said buffer storage element comprises
   a flip-flop (15) having a SET input connected to the threshold circuit (14), and a RESET input connected to said control means (20, 16, 23),
   the RESET input being connected such that said flip-flop is reset in response to a signal applied to the control means initiating a gear shift.

4. System according to claim 3, wherein said control means comprises a microprocessor (16).

5. System according to claim 1, further including a pulse sensing circuit (12, 13) connected in parallel to the solenoid winding of the current controlled pressure regulator (10) and connecting the signal pulse appearing across the solenoid winding upon change-of-state of the friction element in form of a voltage pulse to said threshold circuit (14).

* * * * *